(12) United States Patent  (10) Patent No.: US 6,220,416 B1
Katoh et al.  (45) Date of Patent: Apr. 24, 2001

(54) TEMPERATURE SENSING FAN DRIVE WITH FLUID COUPLING

(75) Inventors: Hirofumi Katoh; Tatsuyuki Matsuya, both of Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/430,129

(22) Filed: Oct. 29, 1999

(30) Foreign Application Priority Data

Oct. 30, 1998 (JP) ................................................ 10-310077

(51) Int. Cl.$^7$ ....................................................... F16D 35/00
(52) U.S. Cl. .................... 192/58.682; 192/58.8; 123/41.12
(58) Field of Search ................... 192/58.8, 58.68, 192/58.682, 58.63, 58.6; 123/41.11, 41.12

(56) References Cited

U.S. PATENT DOCUMENTS 3,983,981 * 10/1976 Snodgrass et al. ................. 192/58.4
4,467,901 * 8/1984 Hattori et al. ..................... 192/58.63
4,909,367 * 3/1990 Elmer ................................ 192/58.62
5,257,686 * 11/1993 Nakamura ........................ 192/58.682

FOREIGN PATENT DOCUMENTS 57-204491 6/1956 (JP) .
3-77825 8/1991 (JP) .

* cited by examiner

*Primary Examiner*—Charles A. Marmor
*Assistant Examiner*—Saul Rodriguez
(74) *Attorney, Agent, or Firm*—Foley & Lardner

(57) ABSTRACT

A temperature-sensing, variable-speed fan drive with a fluid coupling filled with working fluid, for cooling two stacked heat exchangers, namely an engine cooling-system radiator and an air-conditioner condenser located in front of the radiator, comprises a partition plate dividing the internal space of a fan housing into a reservoir chamber and a working chamber, and two different communication ports, each formed in the partition plate to communicate the reservoir chamber with the working chamber. In addition to a first valve mechanism which adjusts the opening of one of the two communication ports in response to atmospheric temperature in the circumference of the housing, a second valve mechanism is provided to adjust the opening of the other of the two communication ports in response to a refrigerant pressure in the air-conditioner condenser. The second valve mechanism includes a valve portion which opens and closes the other communication port, a push rod associated with the valve portion, and an actuator which shifts the push rod from inactive to active in response to a control signal. Also provided is a fan-drive controller which outputs the control signal to the actuator when the refrigerant pressure in the air-conditioner condenser exceeds the predetermined threshold value.

19 Claims, 6 Drawing Sheets

TEMPERATURE SENSING FAN DRIVE WITH FLUID COUPLING

BACKGROUND OF THE INVENTION

1. Field of the Invention

The present invention relates to the improvements of a temperature-sensing, variable-speed fan drive with a fluid coupling, incorporated in a cooling system of an internal combustion engine.

2. Description of the Prior Art

Figure 9:
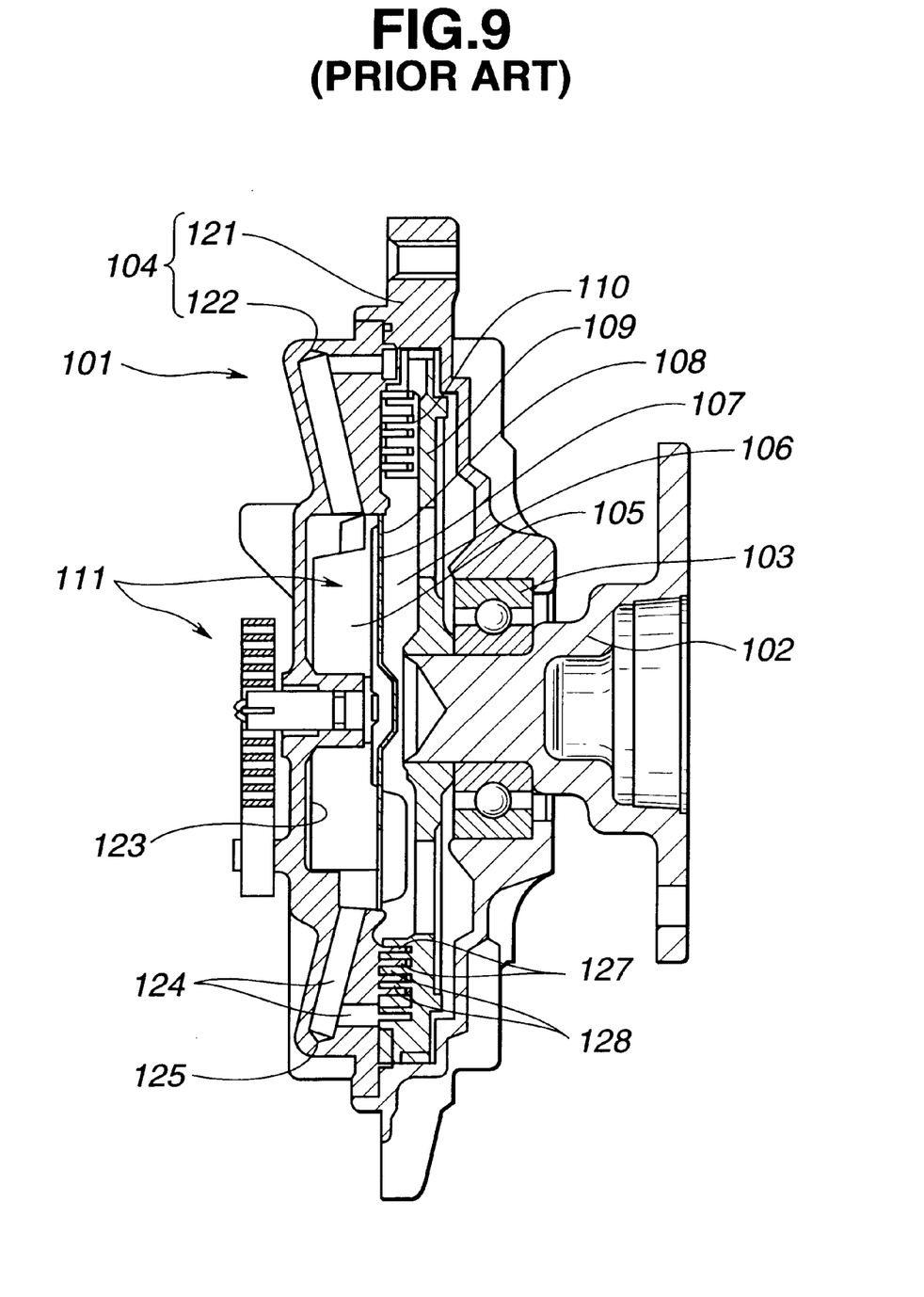
FIG. 9 is a longitudinal cross section of a conventional temperature-sensing fan drive with a fluid coupling.

FIG. 9 shows a typical temperature-sensing, variable-speed viscous fan drive with a small fluid coupling partly filled with a special silicone oil. The conventional fan drive (or a fan coupling device) 101 includes a driven housing 104 rotatably supported on a drive shaft 102 by way of a ball bearing 103, a partition plate 108 dividing the internal space of the housing 104 into a fluid reservoir chamber 105 and a working chamber 106, a communication port 107 formed in the partition plate 108 in such a manner as to intercommunicate the reservoir chamber 105 and the working chamber 106, a rotor 109 fixedly connected to the front end of the drive shaft 102 and housed within the working chamber 106, a torque-transmitting viscous-coupling portion 110 transmitting torque from the rotor 109 to the housing 104, and a valve mechanism 111 capable of regulating the amount of working fluid flowing from the reservoir chamber 105 via the communication port 107 to the working chamber 106 by adjusting or controlling the opening or size of the communication port 107 depending on the atmospheric temperature in the circumference of the housing 104. The drive shaft is driven by the engine crankshaft of an internal combustion engine. As seen in FIG. 9, the housing 104 is constructed by a housing body 121 rotatably supported on the drive-shaft front end through the ball bearing 103, and a front cover portion 122 tightly fitted to the front face of the housing 104. The cover portion 122 has a substantially circular recessed portion 123 formed in its inner peripheral portion to define the reservoir chamber 105. Also, the cover portion 122 has a ring-shaped flanged portion 125 formed in its outer peripheral portion to define a working-fluid return passage 124 therein. The outermost peripheral portion of the housing 104, consisting of the housing body 121 and the cover portion 121, is formed with a plurality of cooling-fan mounting bolt holes for mounting the cooling fan on the housing 104 by means of bolts. The viscous-coupling portion 110 consists of two sets of concentric labyrinth portions 127 and 128 alternately fixed to the flanged portion 125 of the housing and the rotor 109, with the viscous fluid between them. As is generally known, the previously-noted valve mechanism 111 includes a temperature-sensing bimetallic coil, a valve operating shaft, and a valve portion. When engine cooling requirements are low, such as during cool-weather, intermediate-speed operation, the communication port 107 is fully closed by the valve mechanism 111 to cut off the flow of working fluid from the reservoir chamber 105 to the working chamber 106 in order to block the flow of working fluid into the viscous-coupling portion 110. Thus, the working fluid is withdrawn from the torque-transmitting, viscous-coupling portion 110 via the return passage 124 into the reservoir chamber 105. Thus, so less power or torque passes through and the fan speed drops to the minimum. In contrast to the above, when engine cooling requirements are high, such during high temperature, high-speed operation, the communication port 107 is fully opened by the valve mechanism 111 to allow the flow of working fluid from the reservoir chamber 105 to the working chamber 106. Thus, more working fluid is fed via the communication port 107 toward within the torque-transmitting, fluid coupling portion 110. More power or torque passes through the coupling portion 110 and thus the fan speed increases, so as to effectively cool an engine cooling-system radiator. One such temperature-sensing, variable-speed viscous fan drive with a small fluid coupling has been disclosed in Japanese Utility-Model Provisional Publication Nos. 57-204491 and 3-77825. On automotive vehicles with an air conditioning system, a sole temperature-sensing, variable-speed fan coupling device is often used for cooling at least two stacked heat exchangers, namely a cooling-system radiator, and an air-conditioner condenser usually located in front of the radiator. On cars with two stacked heat exchangers, there is the following problem. If the air conditioning system comes into operation under a particular condition where engine cooling requirements are high, as in the summer, and the engine begins to run or is idling, it is difficult to adequately cool the air-conditioner condenser, for the reasons set out below.

That is, when the air conditioning system comes into operation under the previously-noted particular condition, air temperature in the circumference of the air-conditioner condenser rises, and thus refrigerant pressure begins to rise. Suppose the atmospheric temperature in the circumference of the cooling-fan housing does not yet rise. In such a case, the cooling fan never rotates. The condenser cannot be cooled satisfactorily, thus resulting in reduction in the air conditioning system efficiency (the heat exchanging efficiency). To avoid this (to ensure a required airflow through the condenser), it is possible to add auxiliary fans. This induces a more complicated construction of the system, and increases production costs.

SUMMARY OF THE INVENTION

Accordingly, it is an object of the invention to provide a temperature-sensing, variable-speed fan drive with a fluid coupling which avoids the aforementioned disadvantages of the prior art.

It is another object of the invention to provide a sole temperature-sensing, variable-speed fan drive with a fluid coupling, which is capable of satisfactorily cooling at least two stacked heat exchangers, such as a cooling-system radiator and an air-conditioner condenser both located in front of an internal combustion engine, by means of the sole fan drive with the fluid coupling, even when an air-conditioning system comes into operation under a particular condition where engine cooling requirements are high and the engine begins to run or is idling.

In order to accomplish the aforementioned and other objects of the present invention, a temperature-sensing, variable-speed fan drive with a fluid coupling filled with working fluid, for cooling an engine cooling-system heat exchanger and an air-conditioner condenser stacked in front of the cooling-system heat exchanger, comprises a fan housing rotatably supported on a drive shaft having a driven connection with an engine crankshaft, a partition plate dividing an internal space of the fan housing into a working-fluid reservoir chamber and a working chamber, a first communication port formed in the partition plate to communicate the working-fluid reservoir chamber with the working chamber, a second communication port formed in the partition plate and different from the first communication port to communicate the working-fluid reservoir chamber with the working chamber, a rotor fixedly connected to the drive shaft, a torque-transmitting viscous-coupling portion disposed between the rotor and the fan housing to transmit torque from the rotor to the fan housing via the working fluid, a first valve mechanism which adjusts an opening of the first communication port in response to an atmospheric temperature in a circumference of the fan housing, and a second valve mechanism which adjusts an opening of the second communication port in response to a refrigerant pressure in the air-conditioner condenser. It is preferable that the first valve mechanism provides an atmospheric-temperature versus volumetric capacity characteristic that the first communication port begins to open when the atmospheric temperature in the circumference of the fan housing reaches a predetermined lower threshold value, and that the opening of the second communication port increases linearly as the atmospheric temperature in the circumference of the fan housing increases from the predetermined lower threshold value to a predetermined upper threshold value, and that the opening of the second communication port is fixed to a predetermined maximum value when the atmospheric temperature in the circumference of the fan housing exceeds the predetermined upper threshold value, and additionally the second valve mechanism adjusts the opening of the second communication port to a predetermined maximum value, when the refrigerant pressure in the air-conditioner condenser exceeds a predetermined threshold value. More preferably, the second valve mechanism may comprise a valve portion which opens and closes the second communication port formed in the partition plate, a push rod associated with the valve portion to maintain the opening of the second communication port at the predetermined maximum value when the push rod is maintained in an active position and to close the second communication port when the push rod is maintained in an inactive position, an actuator which shifts the push rod from the inactive position to the active position in response to a control signal, and a fan-drive controller which outputs the control signal to the actuator when the refrigerant pressure in the air-conditioner condenser exceeds the predetermined threshold value.

According to another aspect of the invention, a control apparatus for a temperature-sensing, variable-speed fan drive with a fluid coupling filled with working fluid, for cooling an engine cooling-system radiator and an air-conditioner condenser stacked in front of the cooling-system radiator, the fan drive having a fan housing rotatably supported on a drive shaft having a driven connection with an engine crankshaft, a partition plate dividing an internal space of the fan housing into a working-fluid reservoir chamber and a working chamber, a rotor fixedly connected to the drive shaft, and a torque-transmitting viscous-coupling portion disposed between the rotor and the fan housing to transmit torque from the rotor to the fan housing via the working fluid, comprises a first communication port formed in the partition plate to communicate the working-fluid reservoir chamber with the working chamber, a second communication port formed in the partition plate and different from the first communication port to communicate the working-fluid reservoir chamber with the working chamber, a duplex valve system including a first valve mechanism having a first valve portion which adjusts an opening of the first communication port, and a second valve mechanism having a second valve portion which adjusts an opening of the second communication port in response to a refrigerant pressure in the air-conditioner condenser, a temperature-sensing bimetallic coil fixedly connected at one end to the fan housing and mechanically linked at the other end to the first valve portion for adjusting the opening of the first communication port in response to an atmospheric temperature in a circumference of the fan housing, a refrigerant pressure sensor which monitors a refrigerant pressure in the air-conditioner condenser to generate a refrigerant pressure sensor signal, a fan-drive controller electronically connected to the refrigerant pressure sensor to receive the refrigerant pressure sensor signal and to generate a control signal when a value of the refrigerant pressure sensor signal exceeds a predetermined threshold value, and an actuator associated with the second valve portion and being responsive to the control signal from the fan-drive controller to shift the second valve portion from a fully-closed position to a full-open position.

DESCRIPTION OF THE PREFERRED EMBODIMENTS

Figure 6:
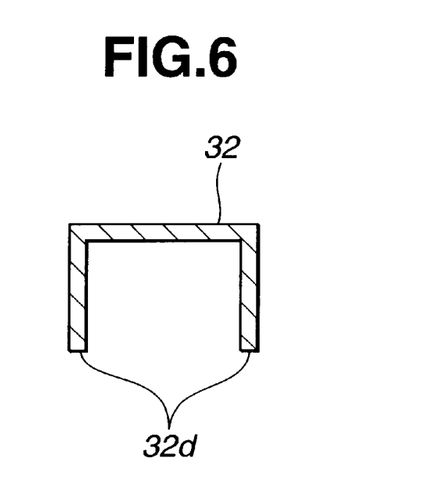
FIG. 6 is a cross section taken along the line A—A of FIG. 5.
Figure 7:
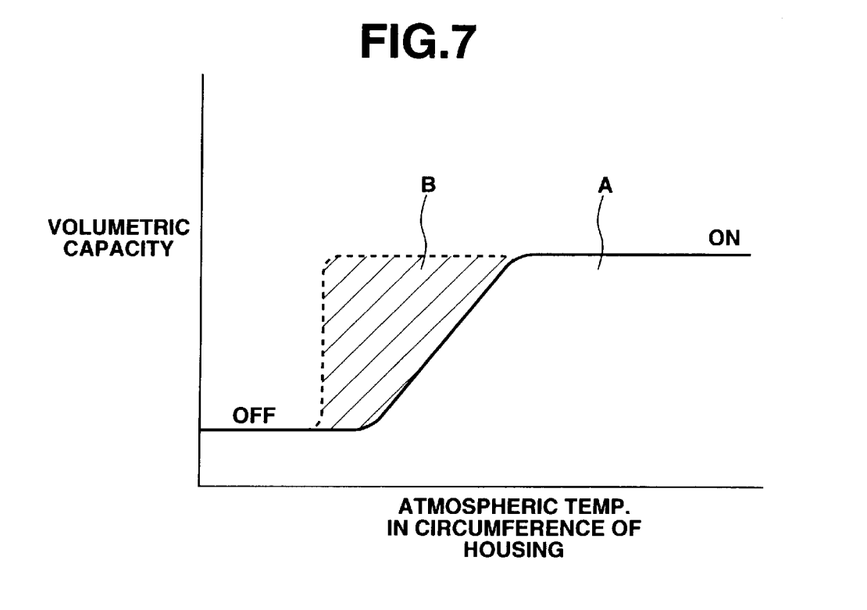
FIG. 7 is a graph illustrating operating characteristics of the first and second valve mechanisms employed in the temperature-sensing fan drive of the embodiment.
Figure 8:
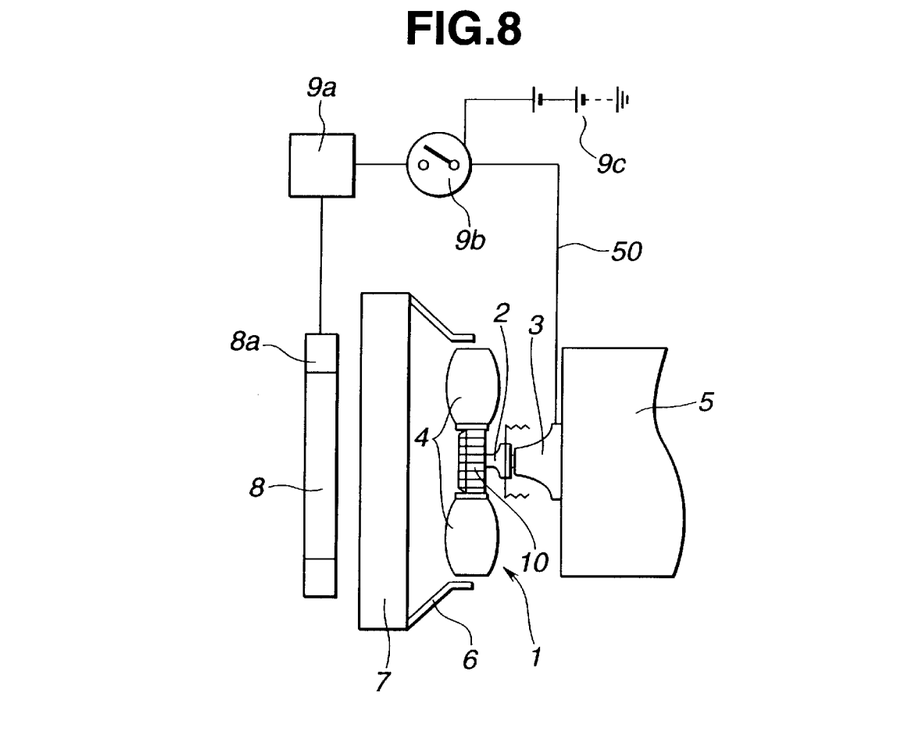
FIG. 8 is a schematic diagram illustrating the heat-exchanger arrangement for an automotive vehicle with a stack of two heat exchangers, that is, a cooling-system radiator, and an air-conditioner condenser, and the layout among the temperature-sensing fan drive of the embodiment, the radiator, and the condenser.

Referring now to FIGS. 1 through 8, the temperature-sensing, variable-speed fan drive of the invention is exemplified in an automotive vehicle with two stacked heat exchangers, namely a cooling-system radiator for an internal combustion engine, and an air-conditioner condenser for an air conditioning system. The fluid coupling of the fan drive of the embodiment is partly filled with a special viscous silicone fluid (oil). As shown in FIG. 8, the temperature-sensing, variable-speed, fluid-coupling-equipped fan drive 1 of the embodiment is located in the front of the engine room of the automotive vehicle. The outer peripheral portion of the fan drive 1 is shrouded by way of a fan shroud 6 attached to the rear side of a cooling-system radiator 7. As shown in FIG. 8, the cooling-system radiator 7 is generally located nearest to the engine (exactly, in the front of the fan drive 1 with the fluid coupling). In the illustrated embodiment, an air-conditioner condenser 8 is located ahead of the radiator 7. The fan drive 1 includes a fan housing or hub 10 rotatably supported on a drive shaft 2 by way of a radial ball bearing 22, a partition plate or a separator plate 13 dividing the internal space of the fan housing 10 into two chambers, that is, a working-fluid reservoir chamber 11 and a working chamber 12, a first communication port 14 formed in the partition plate 13 in such a manner as to communicate the reservoir chamber 11 with the working chamber 12, a rotor 15 fixedly connected to the front end of the drive shaft 2 and housed within the working chamber 12, a driven wheel 17 disposed in the working chamber in such a manner as to oppose to the front face of the rotor 15, a torque-transmitting viscous-coupling portion 16 disposed between the rotor 15 and the driven wheel 17 to transmit a rotational force (or torque) from the rotor 15 to the rotatable fan housing 10 via the working fluid (viscous silicone oil), and a first valve mechanism 26 capable of regulating or adjusting the amount of working fluid flowing from the reservoir chamber 11 to the working chamber 12 by adjusting or controlling the opening of the first communication port 14. The drive shaft 2 has a driven connection with the engine crankshaft of the internal combustion engine. The previously-noted construction of the fan drive 1 is conventional. In the fan drive of the invention, note that a second communication port 23 is formed in the partition plate 13 in such a manner as to communicate the reservoir chamber 11 with the working chamber 12, and also a second valve mechanism 27 is provided to regulate or adjust the amount of working fluid flowing from the reservoir chamber 11 to the working chamber 12 by adjusting or controlling the opening of the second communication port 23, independently of the first valve mechanism 26 associated with the first communication port 14. An electronic fan-drive control unit (simply a controller) 9a is also provided for electronically controlling the second valve mechanism 27, exactly for controlling activation and deactivation of an electromagnetic coil 30c, constructing part of a second-valve-mechanism actuator 30, which will be fully described later.

Figure 1:
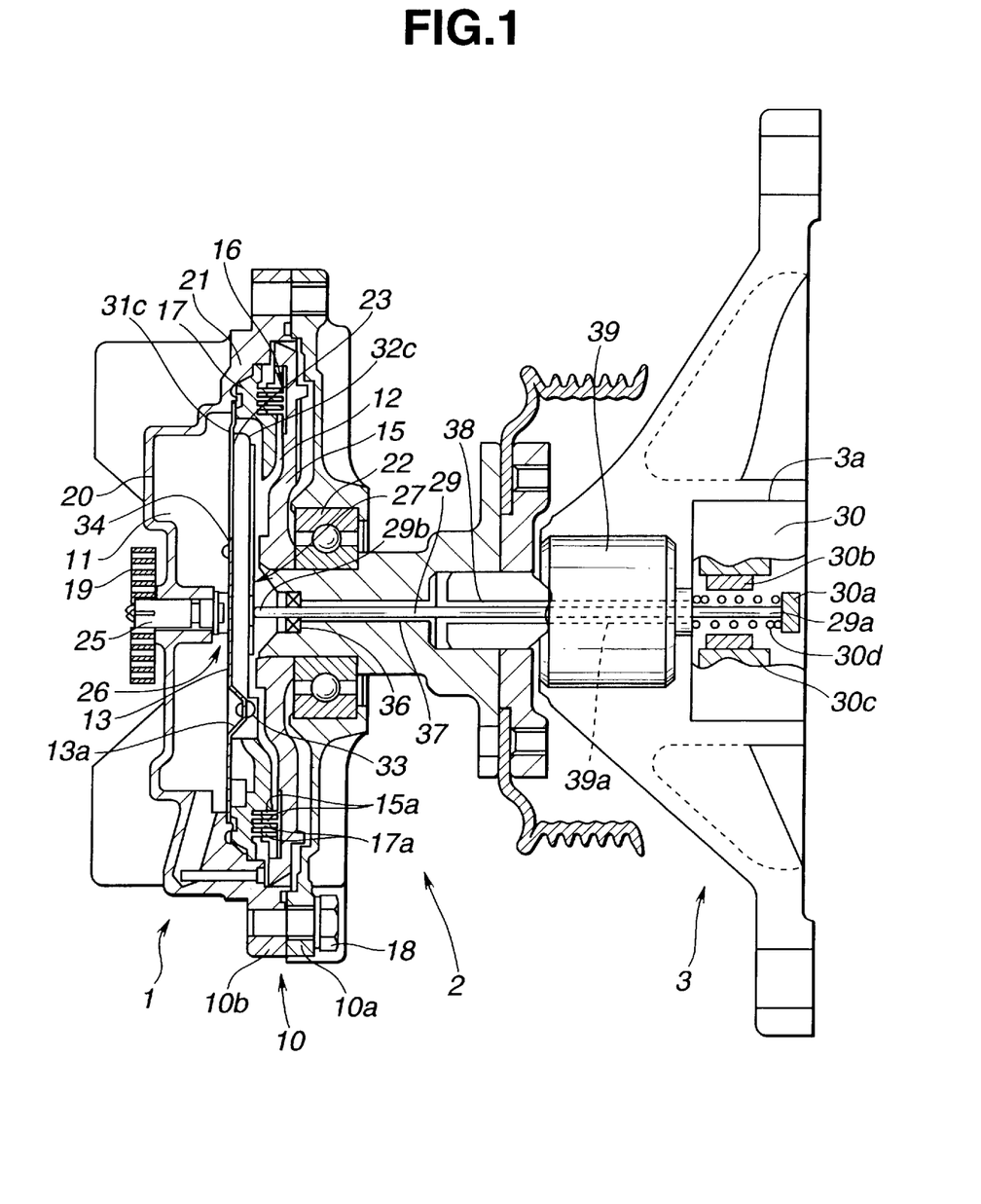
FIG. 1 is a longitudinal cross section of one embodiment of a temperature-sensing fan drive with a fluid coupling according to the invention, under a second valve mechanism is in an in-operative state.
Figure 2:
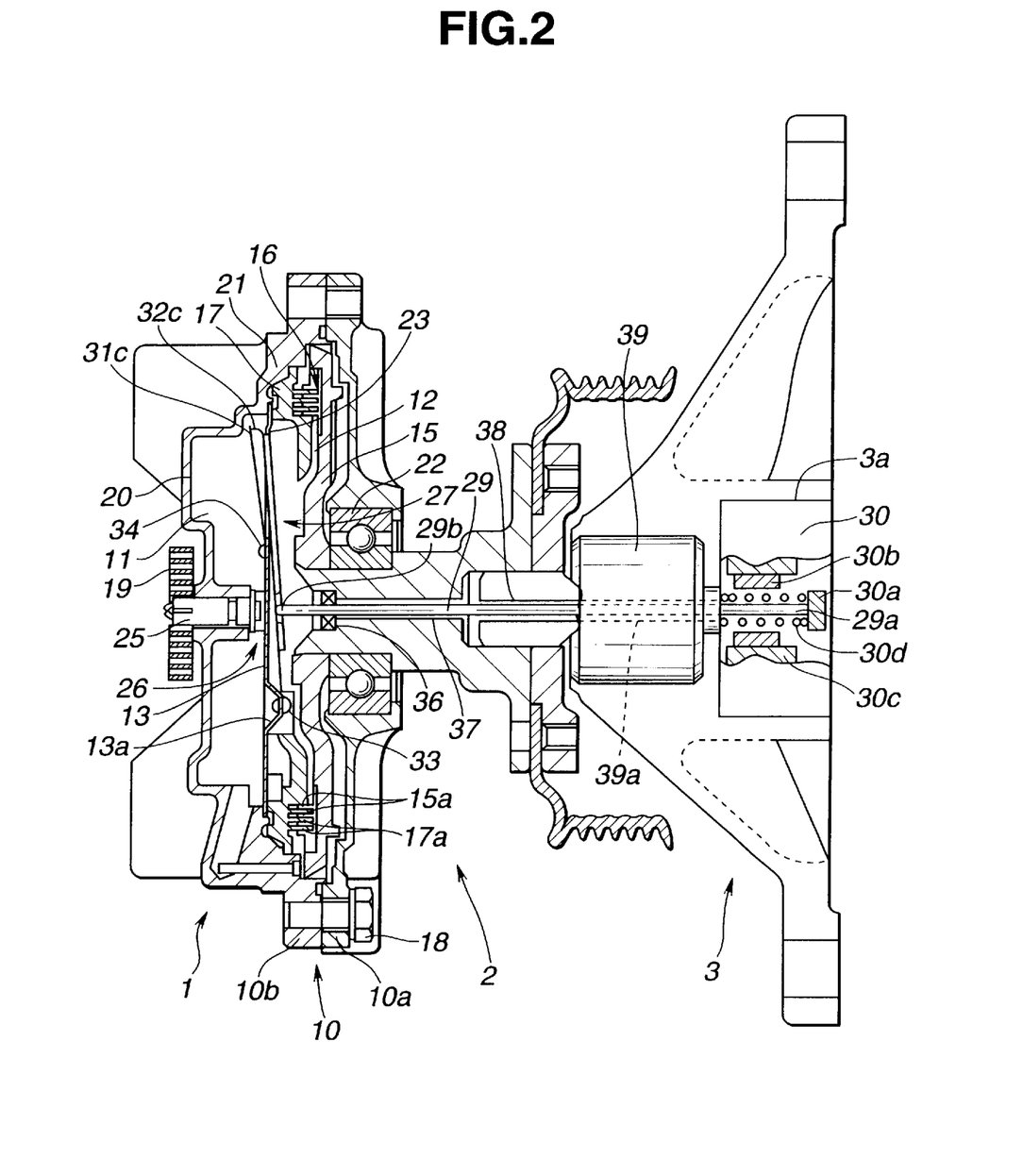
FIG. 2 is a longitudinal cross section of the temperature-sensing fan drive of the embodiment, under the second valve mechanism is in operative.

As best seen in FIGS. 1 and 2, the housing 10 includes a fan housing body 10a rotatably supported on the front end of the drive shaft 2 through the ball bearing 22, and a front cover portion 10b secured to the front face of the housing body 10a by means of bolts 18. The cover portion 10b has a substantially circular recessed portion 20 formed in its inner peripheral portion to define the reservoir chamber 11. As shown in FIG. 8, the outermost peripheral portion of the housing 10 (the housing body 10a and the cover portion 10b) is formed with a plurality of cooling-fan mounting bolt holes for mounting a cooling fan 4 with a plurality of fan blades by means of bolts. Returning to FIGS. 1 and 2, the outer peripheral portion of the driven wheel 17 fixedly connected to the rear face of the cover portion 10b of the housing 10. The rotor 15 has a plurality of annular ridges 15a (corresponding to concentric driving plates) and annular grooves (corresponding to labyrinth grooves). On the other hand, the driven wheel 17 opposing to the rotor 15, has a plurality of annular ridges 17a (corresponding to concentric driven plates) and annular grooves (corresponding to labyrinth grooves). The torque-transmitting viscous-coupling portion 16 is constructed by the previously-noted two sets of plates 15a and 17a alternately fixedly connected to the rotor 15 and the driven wheel 17 (or the housing 10), with the working fluid (viscous fluid) between them. The height of each of the annular ridges (or the annular driven plates) 17a of the driven wheel 17 is designed to be substantially equal to that of each of the annular ridges (or the annular driving plates) 15a of the rotor 15. With the previously-described labyrinth groove structure, when the rotor 15 is driven, viscous shear between the driving (15a) and driven (17a) plates, due to rotational slippage, causes shear torque trans-fer to the driven wheel 17, and thus the torque is transmitted from the rotor 15 by viscous friction between the driving (input) and driven (output) plates 15a and 17a via the driven wheel 17 to the housing 10.

Figure 3:
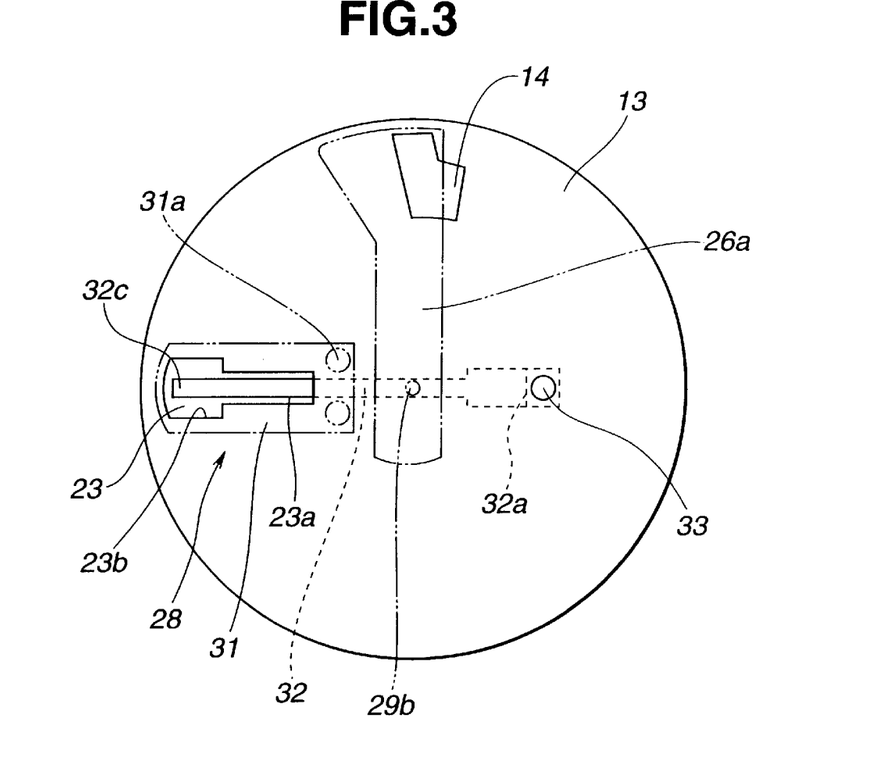
FIG. 3 is an enlarged view illustrating a partition plate employed in the temperature-sensing fan drive of the embodiment.

As best seen in FIG. 3, the partition plate 13 is formed into an essentially circular shape, and made of metallic materials such as a metal sheet. The partition plate 13 is provided in the housing 10 in such a manner as to close the opening end of the substantially circular recessed portion 20 of the cover portion 10b. The circumferentially-extending outer edged portion of the circular-shaped partition plate 13 is fixedly connected to the flanged portion 21 of the cover portion 10b by way of caulking. The partition plate 13 has a substantially cone-shaped embossed portion 13a formed substantially midway between the center and outer edged portion (circumference) of the partition plate 13, and projected toward the rotor 15. Also, the first and second communication ports 14 and 23, angularly spaced by approximately 90 degrees, are located near the outer edged portion and formed in the partition plate 13 by way of punching. As clearly shown in FIG. 3, the first communication port 14 is formed into a substantially L-shape, whereas the second communication port 23 is formed into a substantially T-shaped rectangle extending in the radial direction of the partition plate 13. The second communication port 23 consists of a comparatively small-width bottom fluid-communication portion 23a and a comparatively large-width top fluid-communication portion 23b. As can be appreciated from the phantom line (see the angular position of 12 o'clock or the vertical direction) indicated in FIG. 3, the first valve mechanism 26 is arranged on one side wall of the partition plate 13 so as to adjust the opening of the substantially L-shaped first communication port 14 depending on the atmospheric temperature in the circumference of the housing 10. The first valve mechanism 26 includes an elongated flat-plate first valve portion 26a, a temperature-sensing spiral bimetallic coil 19, and a valve operating shaft 25 (see FIGS. 1 and 2) rotatably supported on the cover portion 10b of the housing 10. The inside end of the bimetallic coil 19 is fixedly connected to the outside end of the valve operating shaft 25, while the outside end of the bimetallic coil 19 is fixedly connected to the cover portion 10b. On the other hand, the inside end of the valve operating shaft 25 is fixedly connected to the first valve portion 26a nearby the center of the partition plate 13. Therefore, when the atmospheric temperature in the circumference of the housing 10 drops, the bimetallic coil 19 contracts, and as a result the valve operating shaft 25 rotates in a direction closing the first communication port 14 by clockwise rotation (viewing FIG. 3) of the first valve portion 26a, while being maintained in sliding-contact with the side-wall face of the partition plate 13. Conversely, when the atmospheric temperature in the circumference of the housing 10 rises, the bimetallic coil 19 extends. As a result, the valve operating shaft 25 rotates in a direction opening the first communication port 14 by counterclockwise rotation (viewing FIG. 3) of the first valve portion 26a, while being maintained in sliding-contact with the side-wall face of the partition plate 13.

Figure 4:
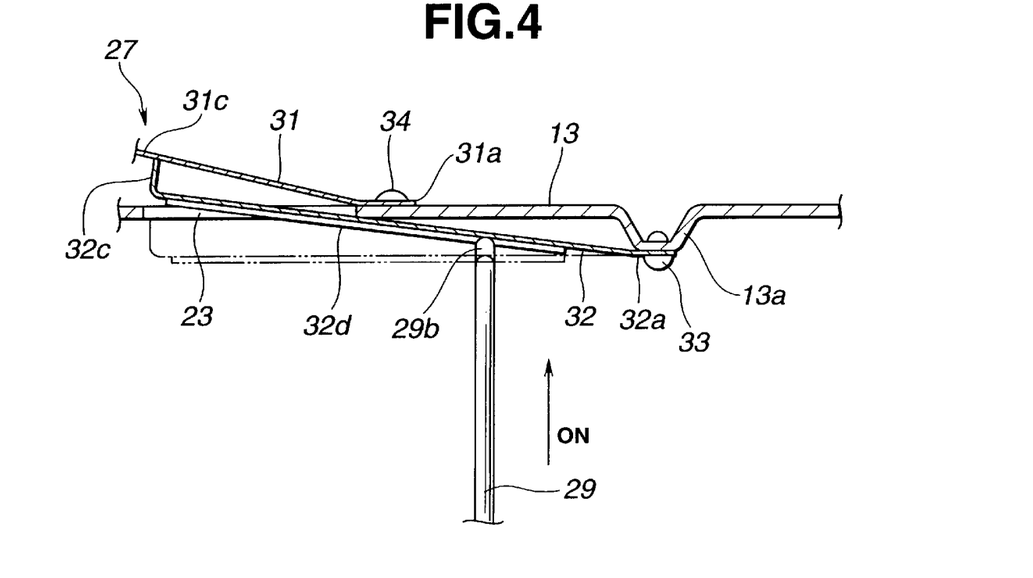
FIG. 4 is an enlarged view explaining the operative state of the second valve mechanism shown in FIG. 3.
Figure 5:
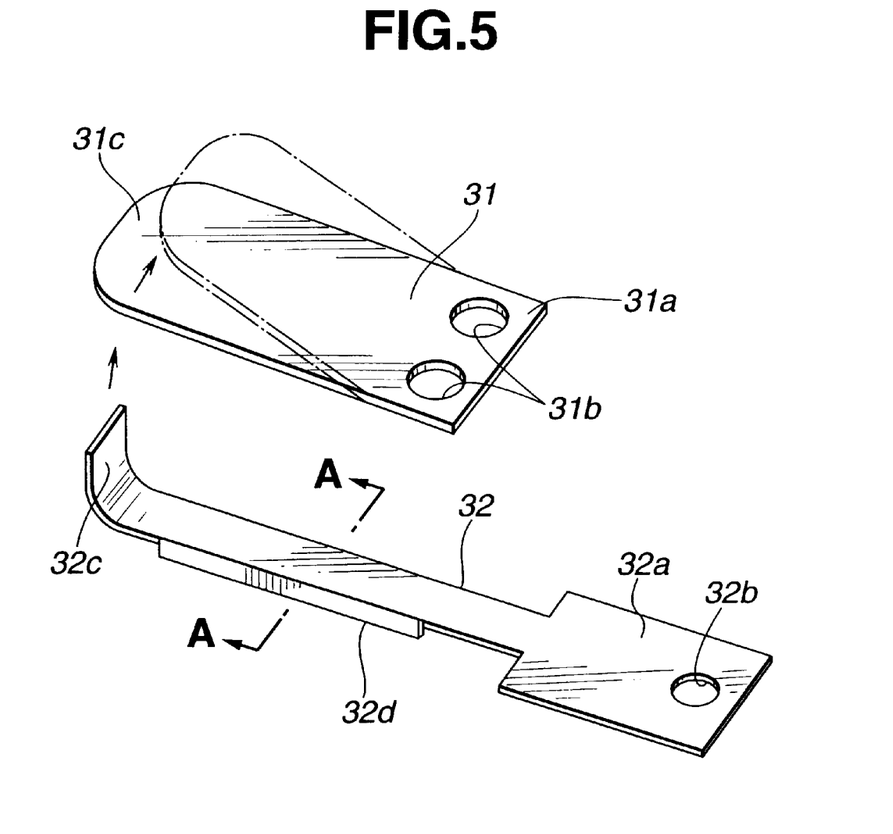
FIG. 5 is a disassembled view illustrating a main valve portion of the second valve mechanism shown in FIGS. 3 and 4.

As appreciated from FIGS. 1 through 6 (especially the phantom line of FIG. 3 (see the angular position of 9 o'clock or the horizontal direction), the second valve mechanism 27 is arranged in such a manner as to be angularly spaced by approximately 90 degrees from the first valve mechanism 26. As best seen in FIGS. 3 and 4, the second valve mechanism 27 includes a second valve set 28 capable of opening and closing the second communication port 23, a push rod 29 associated with the second valve set 28, and an electromagnetically-operated (or solenoid-operated) second valve actuator 30. As seen in FIGS. 3 through 6, the second valve set 28 includes a second valve portion 31 provided on the forward side wall of the partition plate 13 except a predetermined sliding-motion area of the first valve portion 26a, and a push arm 32 provided on the backward side wall of the partition plate 13 for pushing the back face of the second valve portion 31 in a direction opening the second valve portion. As appreciated from FIGS. 3, 4, and 5, the second valve portion 31 is substantially rectangular in shape and somewhat similar to a reed valve only in appearance. The reed valve and the second valve portion are very alike in appearance but quite different in nature. That is, the typical reed valve itself is generally is operated by a differential pressure, however, the second valve portion 31 is forcibly operated by means of the push rod 29. As best seen in FIG. 5, the installation end 31a of the second valve portion 31 is formed with two rivet holes 31b. Actually, the second valve portion is attached onto the one side wall (the forward side wall) of the partition wall 13 by means of rivets 34. The riveted installation end 31a of the second valve portion 31 serves as a fulcrum, and the tip end 31c of the second valve portion 31 functions as a leaf spring that is elastically deformable and pre-loaded in a direction closing the second communication port 23. As shown in FIGS. 5 and 6, the push arm 32 is formed as an elongated plate. The push arm is comprised of an installation end 32a having a rivet hole 32b, and a substantially 90°-curved tip end 32c being elastically permanently in contact with the back face of the tip end 31c of the second valve portion 31 via the large-width top fluid-communication portion 23b of the second communication port 23. The push arm 32 is attached onto the embossed portion 13a of the other side wall (the backward side wall) of the partition plate 13 by means of a rivet 33. In order to reliably transmit a pushing force created by the stroke of the push rod 29 (detailed later) via the push arm 32 to the second valve portion 31, the push arm 32 is bent backwards at its intermediate portion to form two opposing side wall portions 32d and to enhance the rigidity of the push arm 32 (see the C-shaped cross section of FIG. 6). The side wall portions 32d also serve as a sliding-motion guide for the semi-spherical pushing end 29b of the push rod 29 during activation of the push rod 29 (or the electromagnetically-operated second valve actuator 30). A part of the free end of the push arm containing the curved tip end 32c (substantially ⅓ the entire length of the push arm 32) is loosely engaged with small-width bottom fluid-communication portion 23a of the second communication port 23, in such a manner as to allow elastic deformation of part of the free end of the push arm 32 in the valve opening direction.

As clearly shown in FIGS. 1 and 2, the push rod 29 is slidably inserted into and disposed in insertion holes 37 and 38 formed in the drive shaft 2, and an insertion hole 39a of a bearing 39 incorporated in an actuator mounting bracket 3 connected to the engine cylinder head 5. The bottom end 29a of the push rod 29 is connected to a movable core 30a of the electromagnetically-operated second valve actuator 30, the semi-spherical pushing end 29b of the push rod 29 is in contact with the push-arm intermediate portion with the two opposing side wall portions 32d and slidably supported on the inner periphery of an annular oil seal 37 in a fluid-tight fashion. The second valve actuator 30 is provided in a holding groove or an actuator accommodating bore 3a formed in the mounting bracket 3 and facing to the front end of the cylinder head 5. The actuator 30 is comprised of an electromagnetic coil 30c energized or de-energized in response to a control signal (or a command signal) from the controller 9a, a stationary core 30b fixedly connected to the inner periphery of the electromagnetic coil 30c, and the movable core 30a connected to the bottom end 29a of the push rod 29 and located near the opening end of the accommodating bore 3a of the mounting bracket 3. A return spring 30d is disposed between the bottom end of the bore 3a and the inside wall surface of the movable core 30a so as to bias the movable core (that is, the push rod 29) in the rightward axial direction (in the second-valve closing direction). In the shown embodiment, the return spring 30d is designed so that the pushing end 29a of the push rod 29 begins to break contact with the back face of the push arm 32 when the push rod 29 (or the movable core 30a) is maintained at its spring-loaded position (an initial position or an inactive position), thereby increasing the responsiveness to valve opening action of the second valve mechanism 27 based on the control signal from the controller 9a. In a conventional manner, the controller 9a comprises a microcomputer generally constructed by a central processing unit (CPU), an input/output interface, and a computer memory. As seen in FIG. 8, the input interface of the controller 9a receives a signal from a refrigerant pressure sensor 8a. The refrigerant pressure sensor 8a is mounted on the air-conditioner condenser 8 for monitoring and relaying refrigerant pressure information (a refrigerant pressure sensor signal) to the input interface of the controller 9a. The CPU of the controller 9a monitors a specified pressure (or a predetermined refrigerant pressure threshold), and compares it to the refrigerant pressure sensor signal. The previously-noted specified pressure is defined as a pressure criterion above which an air-conditioner cut-off switch becomes ON. When the refrigerant pressure sensor signal value is above the specified pressure threshold, the output interface of the controller 9a generates a control signal (an ON signal) to a second-valve-mechanism electromagnetic-coil activation switch 9b to turn the switch 9b ON. With the switch 9b turned ON, electric power is sent from an electric power supply (a battery) 9c via a harness 50 to the electromagnetic coil 30c incorporated in the actuator mounting bracket 3.

With the previously-described arrangement, in hot weather such as in summer, the temperature-sensing, variable-speed viscous fan drive 1 of the embodiment, especially the second valve mechanism 27 operates as follows.

If engine coolant temperature is still low when starting a cold engine or when the engine is idling in the summer, the atmospheric temperature in the circumference of the housing 9 does not yet rise sufficiently. In such a case, the first valve portion 26a of the first valve mechanism 26 remains closed. For example, when the air conditioner comes into operation when the engine is idling after cold engine start, air temperature in the circumference of the air-conditioner condenser 8 tends to rise. As a result, the refrigerant pressure in the condenser 8, monitored by the refrigerant pressure sensor 8a, also rises. When the refrigerant pressure sensor signal value exceeds the predetermined threshold value (the specified pressure level) owing to the pressure rise in refrigerant, the second-valve-mechanism electromagnetic-coil activation switch 9b is switched ON. Thus, the electromagnetic coil 30c is energized, and as a result the movable core 30a is attracted toward the stationary core 30b by way of the latter core excited. As a consequence, the push rod 29 is shifted from the initial position (the spring-loaded position) shown in FIG. 1 to the active position shown in FIGS. 2 and 4. Due to the sliding motion of the push rod 29, the push arm 32 is pressed strongly against the back face of the second valve portion 31 by means of the curved tip end 32c, so as to urge the free end of the second valve portion 31 toward within the reservoir chamber 11, thus opening the second valve portion 31 and increasing the opening of the second communication port 23. As a result of this, the working fluid (silicone oil) in the reservoir chamber 11 flows into the working chamber 12, and thus fed to the torque-transmitting viscous-coupling portion 16. This results in an increase in torque transmitted from the rotor 15 via the viscous coupling portion 26 to the fan housing 10. The cooling fan 4 as well as the fan housing 10 can rotate at high rotational speeds. For the reasons set out above, as can be appreciated from the hatched zone B illustrated in FIG. 7, even when the atmospheric temperature in the circumference of the fan housing 10 is low, the cooling fan 4 is rotated in order to increase the volumetric capacity of airflow through the two stacked heat exchangers, namely the air-conditioner condenser 8 and the cooling-system radiator 7. Therefore, the air-conditioner condenser 8 can be effectively cooled, even when the air-conditioning system comes into operation under a particular condition where engine cooling requirements are high and the engine begins to run or during idling. The viscous-fan-drive characteristic of the embodiment indicated by the broken line or the hatched zone B of FIG. 7 is limited to a particular condition where the engine cooling requirements are high when starting a cold engine or when the engine is idling after the cold engine start. Only when the refrigerant pressure in the condenser 8, monitored by the refrigerant pressure sensor 8a, also rises. When the refrigerant pressure sensor signal value exceeds the predetermined threshold value under the previously-noted particular condition, the second valve mechanism 27 is actuated to fully open the second communication port 23. As indicated by the broken line or the hatched zone B of FIG. 7, the volumetric capacity of the cooling fan rises in a stepwise manner, with the refrigerant pressure above the predetermined threshold value and under the particular condition. In other words, when the particular condition is satisfied, the second valve mechanism is responsive to the refrigerant pressure sensor signal value exceeding the predetermined threshold value, to adjust the opening of the second communication port to a predetermined maximum value. In this manner, the refrigerant pressure sensor 8a, the controller 9a, the switch 9b, the second valve mechanism 27 and the second-valve-mechanism actuator 30 cooperate with each other to adequately cool the air-conditioner condenser 8, without preventing engine warm-up. This enhances the heat exchanging efficiency of the air conditioning system. Additionally, the temperature-sensing, variable-speed viscous fan drive 1 of the present embodiment, having the duplex valve system, that is, the first and second valve mechanisms 26 and 27, eliminates the necessity for auxiliary fans used to lower refrigerant pressure in the air-conditioner condenser 8.

Conversely, when the refrigerant pressure sensor signal value is below the specified pressure level, the second-valve-mechanism electromagnetic-coil activation switch 9b remains open. The stationary core 30b is not excited, and thus the stationary core 30a is kept at its spring-loaded position shown in FIG. 1. Therefore, the second valve portion 31 is maintained at its closed position to fully close the second communication port 23, and thus to block the flow of working fluid from the reservoir chamber 11 to the working chamber 12. For this reason, the flow rate of working fluid supplied to the torque-transmitting viscous-coupling portion 16 is reduced. This results in a drop in torque transmitted from the rotor 15 via the driven wheel 17 to the fan housing body 10a. The rotational speed of the cooling fan 4 attached to the housing 10 decreases, and then the rotational motion of the fan stops.

On the other hand, as appreciated from the characteristic curve indicated by the solid line or the zone A of FIG. 7, when the engine coolant temperature rises and the atmospheric temperature in the circumference of the fan housing 10 also rises, the bimetallic coil 19 extends. According to the characteristic curve indicated by the solid line or the zone A of FIG. 7, when the atmospheric temperature in the circumference of the housing 10 reaches a predetermined temperature value (or a predetermined lower threshold value), the first valve mechanism 26 begins to open. Thereafter, when the rise in atmospheric temperature in the circumference of the housing 10 continues, the opening of the first communication port 14 increases substantially in a linear fashion. After this, as soon as the atmospheric temperature in the circumference of the housing 10 exceeds a predetermined upper threshold value, the volumetric capacity of the cooling fan is fixed to a maximum value with the first communication port fully opened. Therefore, according to the increase in the atmospheric temperature in the circumference of the housing 10, the first valve mechanism 26 operates so that the valve operating shaft 25 rotates in a direction opening the first communication port 14, and so that the working fluid in the reservoir chamber 11 flows into the working chamber 12, and then is delivered into the torque-transmitting viscous-coupling portion 16. As a result of this, the torque transmitted from the rotor 15 through the viscous coupling portion 16 and the driven wheel 17 to the fan housing body 10a increases, and thus the fan 4 as well as the housing 10 can rotate at high speeds. This effectively cools the air-conditioner condenser 7.

As will be appreciated from the above, according to the present invention, if refrigerant pressure in an air-conditioner condenser located in front of a cooling-system radiator is high under a condition of low atmospheric temperature in the circumference of a fan housing, a second communication port can be forcibly opened by means of a second valve mechanism, so as to permit working fluid (silicone coil) in a reservoir chamber to flow into a working chamber and adequately feed the working fluid to a torque-transmitting viscous-coupling portion disposed between the rotor and the fan housing. Thus, a torque transmitting efficiency of the viscous-coupling portion can be enhanced and a high fan speed of the cooling fan attached to the fan housing can be attained, even under a particular condition of low atmospheric temperature in the circumference of the fan housing and high refrigerant pressure in the air-conditioner condenser. As a consequence, under the previously-noted particular condition, the air-conditioner condenser can be effectively cooled, thus preventing an heat exchanging efficiency of the air conditioning system from being reduced. As discussed above, although the temperature-sensing, variable-speed viscous fan drive of the invention is simple in construction, it is possible to effectively drop the refrigerant pressure in the air-conditioner condenser under the previously-noted particular condition. This eliminates the need for addition of auxiliary fans, thus simplifies the construction of the viscous fan drive, and thereby reducing production costs.

Furthermore, according to the viscous fan drive of the invention, a fan-drive controller is designed to generate a control signal to an electromagnetically-operated push-rod actuator (or a second-valve-mechanism actuator), and also a second valve portion of a second valve mechanism, which is associated with a second communication port and different from a typical valve mechanism comprised of a temperature-sensing bimetallic coil, a valve operating shaft, and a slidable, rotatable valve portion associated with a first communication port, is forcibly pushed and opened by way of a push rod connected to the push-rod actuator, so as to allow the flow of working fluid in the reservoir chamber into the working chamber. As a result, even under the particular condition, a torque transmitting efficiency of the torque-transmitting viscous-coupling portion can be enhanced and the cooling fan attached to the fan housing can be rotated at high speeds so as to effectively cool the air-conditioner condenser and to prevent reduction in the heat-exchanging efficiency of the air conditioning system. The previously-noted electromagnetically-operated push-rod actuator or the second-valve-mechanism actuator is also simple in construction, thus reducing total production costs.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A fan drive for cooling an engine cooling-system heat exchanger and an air-conditioner condenser stacked in front of the cooling-system heat exchanger, comprising:
    a fan housing rotatably supported on a motor driven drive shaft;
    a partition plate dividing an internal space of the fan housing into a working-fluid reservoir chamber and a working chamber:
    a first communication port formed in the partition plate to communicate the working-fluid reservoir chamber with the working chamber;
    a second communication port formed in the partition plate to communicate the working-fluid reservoir chamber with the working chamber;
    a rotor fixedly connected to the drive shaft;
    a torque-transmitting viscous-coupling portion disposed between the rotor and the fan housing to transmit torque from the rotor to the fan housing via the working fluid;
    a first valve mechanism which adjusts an opening of the first communication port in response to an atmospheric temperature in a circumference of the fan housing; and
    a second valve mechanism which adjusts an opening of the second communication port in response to a refrigerant pressure in the air-conditioner condenser.

2. The fan drive as claimed in claim 1, wherein the first valve mechanism provides an atmospheric-temperature versus volumetric capacity characteristic that the first communication port begins to open when the atmospheric temperature in the circumference of the fan housing reaches a predetermined lower threshold value, and that the opening of the second communication port increases linearly as the atmospheric temperature in the circumference of the fan housing increases from the predetermined lower threshold value to a predetermined upper threshold value, and that the opening of the second communication port is fixed to a predetermined maximum value when the atmospheric temperature in the circumference of the fan housing exceeds the predetermined upper threshold value, and wherein the second valve mechanism adjusts the opening of the second communication port to a predetermined maximum value, when the refrigerant pressure in the air-conditioner condenser exceeds a predetermined threshold value.

3. The fan drive as claimed in claim 1 wherein the second valve mechanism comprises a valve portion which opens and closes the second communication port formed in the partition plate, a push rod associated with the valve portion to maintain the opening of the second communication port at the predetermined maximum value when the push rod is maintained in an active position and to close the second communication port when the push rod is maintained in an inactive position, an actuator which shifts the push rod from the inactive position to the active position in response to a control signal, and a fan-drive controller which outputs the control signal to the actuator when the refrigerant pressure in the air-conditioner condenser exceeds the predetermined threshold value.

4. The fan drive as claimed in claim 3, further comprising:
    a temperature-sensing bimetallic coil fixedly connected at one end to the fan housing and mechanically linked at the other end to the first valve mechanism for adjusting the opening of the first communication port in response to the atmospheric temperature in the circumference of the fan housing;
    a refrigerant pressure sensor which monitors the refrigerant pressure in the air-conditioner condenser to generate a refrigerant pressure sensor signal;
    a fan-drive controller electronically connected to the refrigerant pressure sensor to receive the refrigerant pressure sensor signal and to generate a control signal when a value of the refrigerant pressure sensor signal exceeds a predetermined threshold value; and
    an actuator associated with the second valve mechanism and being responsive to the control signal from the fan-drive controller to shift the second valve mechanism from a fully-closed position to a full-open position.

5. The fan drive as claimed in claim 4, wherein the second valve mechanism comprises a push rod to maintain the opening of the second communication port at a predetermined maximum value when the push rod is maintained in an active position and to close the second communication port when the push rod is maintained in an inactive position, and the actuator shifts the push rod from the inactive position to the active position in response to the control signal.

6. The fan drive as claimed in claim 5, wherein the actuator comprises a solenoid-operated actuator, which comprises:
    an electromagnetic coil which is selectively energized in response to the control signal from the fan-drive controller,
    a stationary core fixedly connected to an inner periphery of the electromagnetic coil, and
    a movable core connected to a bottom end of the push rod.

7. The fan drive as claimed in claim 6, wherein the first communication port has a substantially L-shape, and the second communication port has a substantially T-shaped rectangle extending in a radial direction of the partition plate, and wherein the second communication port comprises a small-width bottom fluid-communication portion and a large-width top fluid-communication portion.

8. The fan drive as claimed in claim 7, wherein the partition plate has a substantially cone-shaped embossed portion which is projected toward the rotor, and the valve portion of the second valve mechanism comprises a push arm which is attached to the embossed portion of the partition plate, so that the push arm pushes a back face of the valve portion of the second valve mechanism in a direction opening the valve portion of the second valve mechanism.

9. The fan drive as claimed in claim 8, wherein the push arm is bent at an intermediate portion thereof to form a substantially C-shaped cross section except at an installation end of the push rod.

10. The fan drive as claimed in claim 9, wherein the push rod pushes a back face of the push arm.

11. The fan drive as claimed in claim 10, wherein the push rod is moved toward the push arm by attraction produced by the electromagnetic coil of the solenoid operated actuator.

12. The fan drive as claimed in claim 11, which further comprises a second-valve-mechanism electromagnetic-coil activation switch which is closed to supply electric power from an electric power supply to the electromagnetic coil of the solenoid-operated actuator, and wherein, when the refrigerant pressure, monitored by the refrigerant pressure sensor of the air-conditioner condenser, exceeds the predetermined threshold value corresponding to a specified pressure criterion above which an air-conditioner cut-off switch closes, the controller issues the control signal to the second-valve-mechanism electromagnetic-coil activation switch to close the switch and transmit electric power from the electric power supply to the electromagnetic coil.

13. The fan drive as claimed in claim 12, the first valve mechanism comprises a valve portion which adjusts an opening of the first communication port, and the valve portion of the first valve mechanism is moved by the temperature-sensing bimetallic coil.

14. The fan drive as claimed in claim 13, wherein the valve portion of the first valve mechanism is formed as an elongated flat-plate valve portion which is rotated by the temperature-sensing bimetallic coil.

15. The fan drive as claimed in claim 14, wherein the first and second communication ports are formed in the partition plate by punching.

16. The fan drive as claimed in claim 15, wherein the push arm is attached to the embossed portion of the partition plate by riveting.

17. A fan drive comprising:
a fan housing rotatably supported on a drive shaft so as to be relatively rotatable with respect thereto;
a partition plate dividing an internal space of the fan housing into a working-fluid reservoir chamber and a working chamber;
a first communication port formed in the partition plate to communicate the working-fluid reservoir chamber with the working chamber;
a second communication port formed in the partition plate to communicate the working-fluid reservoir chamber with the working chamber;
a rotor fixedly connected to the drive shaft;
a torque-transmitting viscous-coupling portion operatively disposed between the rotor and the fan housing to transmit torque from the rotor to the fan housing via the working fluid;
a first valve mechanism which adjusts an opening of the first communication port in response to an atmospheric temperature in a circumference of the fan housing; and
a second valve mechanism which adjusts an opening of the second communication port in response to a sensed energy level indicative parameter.

18. A control apparatus for a fan drive which cools an engine cooling-system radiator and an air-conditioner condenser disposed in front of the cooling-system radiator, the fan drive having a fan housing rotatably supported on a motor driven drive shaft, a partition plate dividing an internal space of the fan housing into a working-fluid reservoir chamber and a working chamber, a rotor fixedly connected to the drive shaft and a torque-transmitting viscous-coupling operatively disposed between the rotor and the fan housing to transmit torque from the rotor to the fan housing via the working fluid, the control apparatus comprising:
a first communication port formed in the partition plate to communicate the working-fluid reservoir chamber with the working chamber;
a second communication port formed in the partition plate and different from the first communication port to communicate the working-fluid reservoir chamber with the working chamber:
a duplex valve system including a first valve mechanism having a first valve portion which adjusts an opening of the first communication port, and a second valve mechanism having a second valve portion which adjusts an opening of the second communication port;
a temperature-sensing bimetallic coil fixedly connected at one end to the fan housing and mechanically linked at the other end to the first valve mechanism for adjusting the opening of the first communication port in response to an atmospheric temperature proximate the fan housing;
a pressure sensor which monitors a refrigerant pressure in the air-conditioner condenser to generate a refrigerant pressure sensor signal;
a fan-drive controller electronically connected to the refrigerant pressure sensor to receive the refrigerant pressure sensor signal and to generate a control signal when a value of the refrigerant pressure sensor signal exceeds a predetermined threshold value; and
an actuator associated with the second valve mechanism which is responsive to the control signal from the fan-drive controller to shift the second valve mechanism from a fully-closed position to a full-open position.

19. The control apparatus as claimed in claim 18, wherein the second valve mechanism comprises a push rod which maintains the opening of the second communication port at a predetermined maximally open value when the push rod is in an active position and to close the second communication port when the push rod is in an inactive position, and wherein the actuator shifts the push rod from the inactive position to the active position in response to the control signal.

* * * * *